United States Patent Office 3,323,047
Patented May 30, 1967

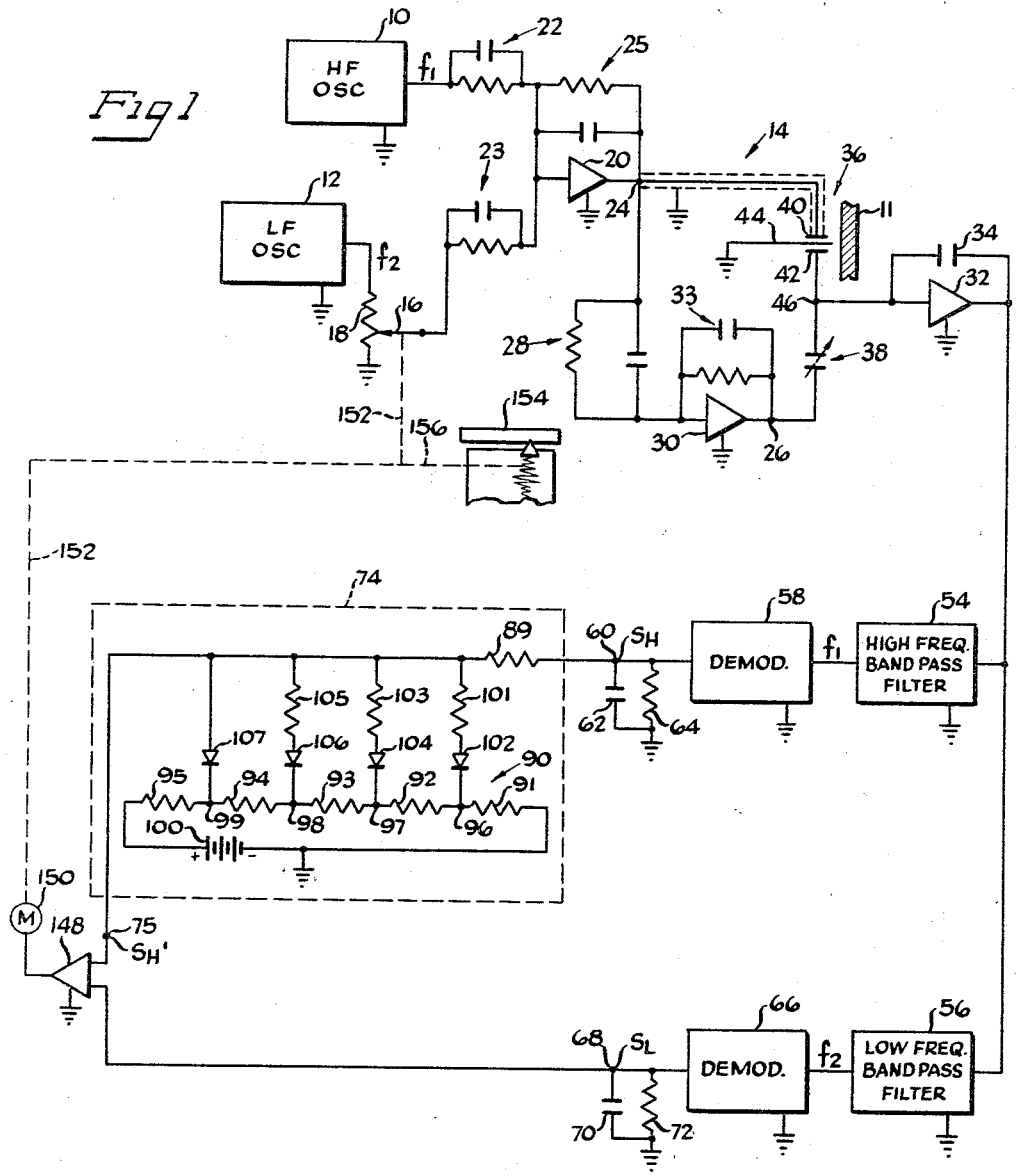

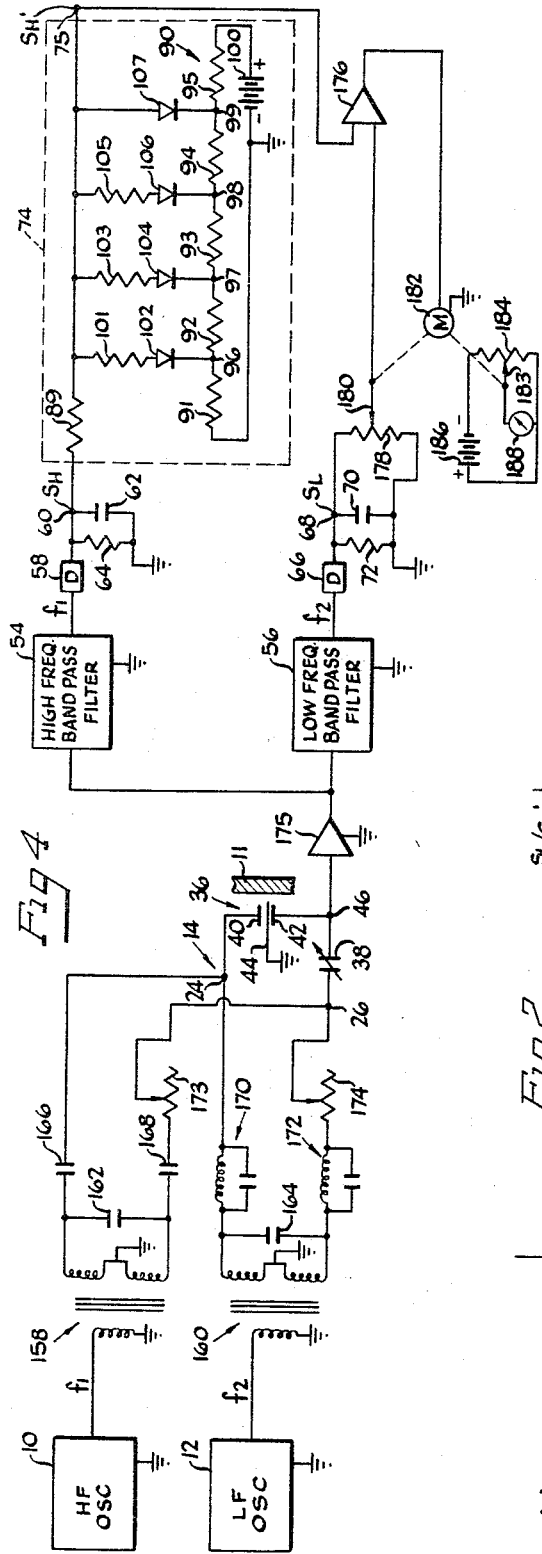
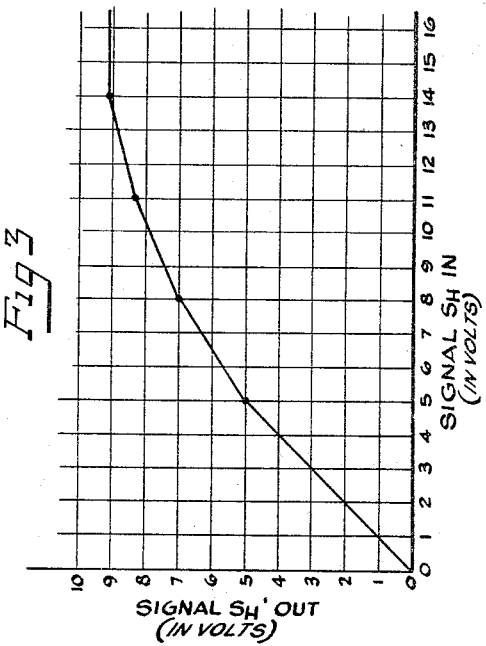
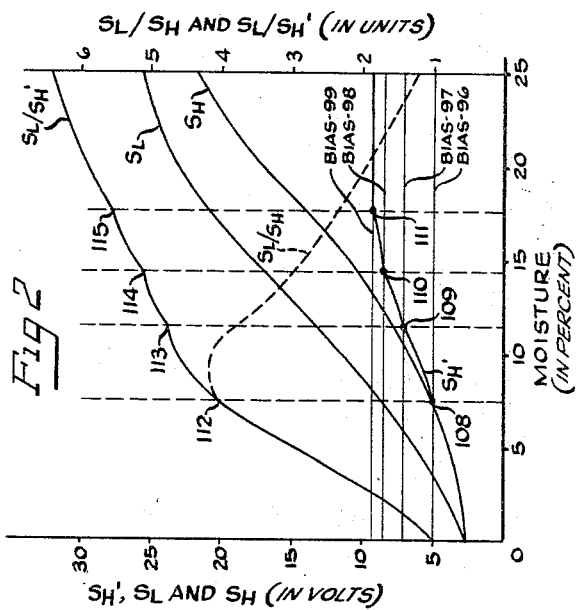
Inventors
ROBERT W. MARTIN
ALAN NORWICH

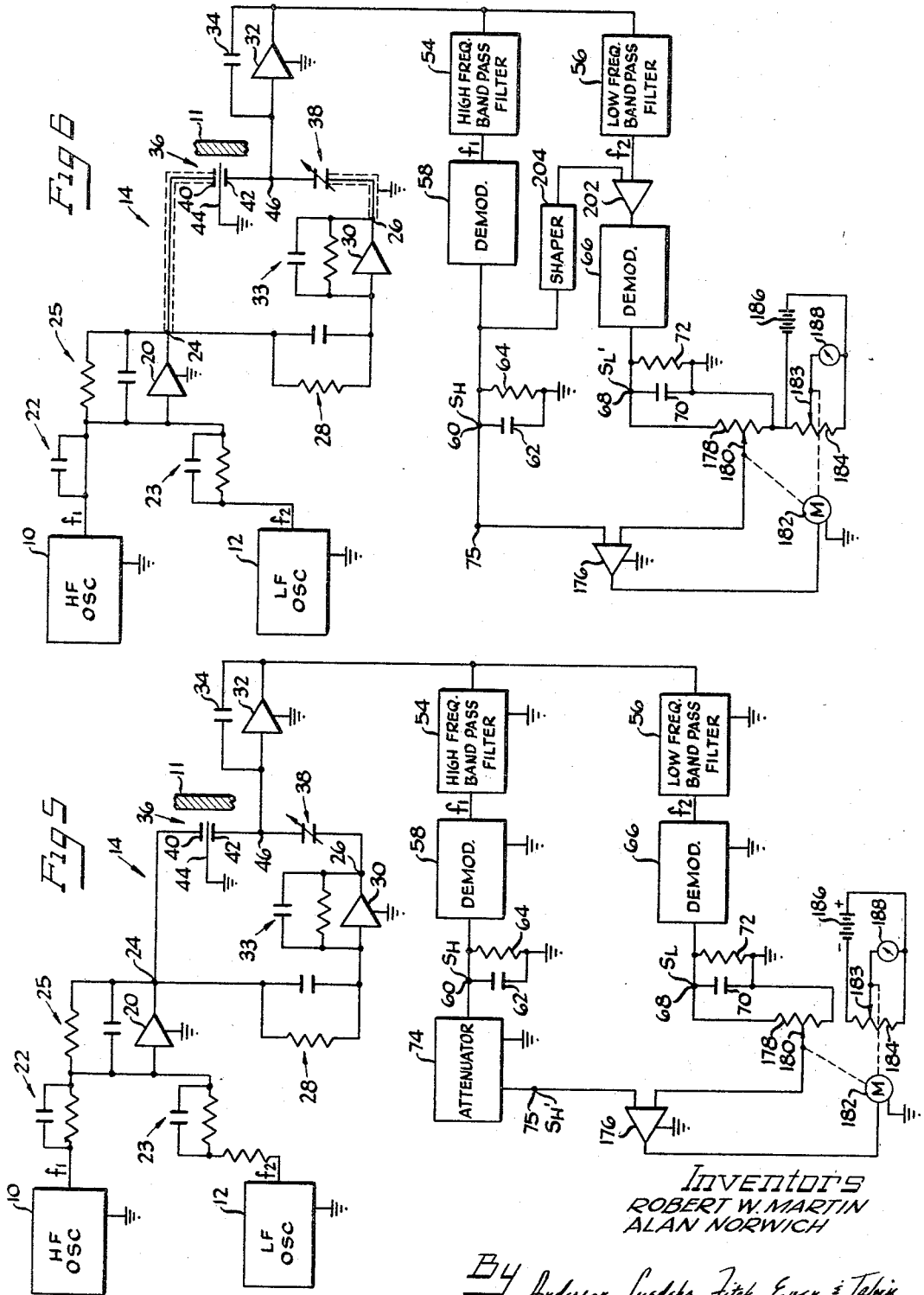

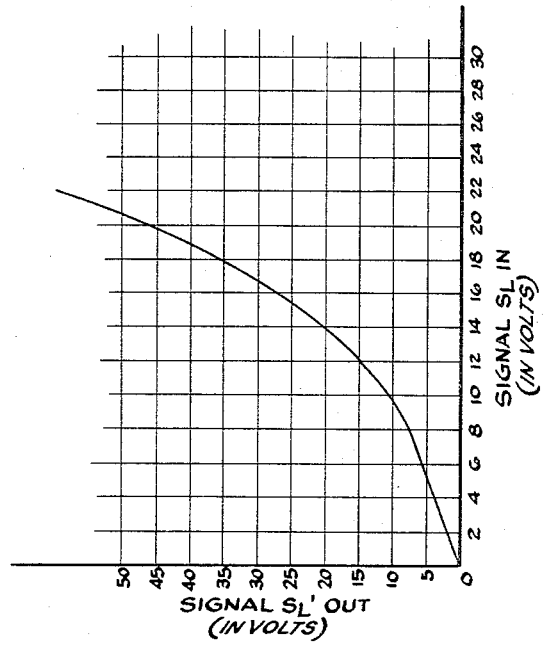
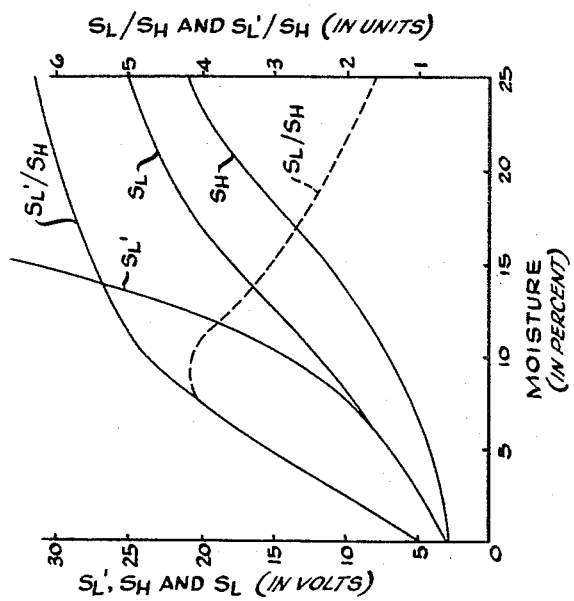

3,323,047
TWO-FREQUENCY DIELECTRIC MEASURING SYSTEM INCLUDING A VARIABLE GAIN CIRCUIT FOR MODIFYING THE AMPLITUDE OF AT LEAST ONE OF TWO DETECTION SIGNALS
Robert W. Martin, Dublin, and Alan Norwich, Columbus, Ohio, assignors to Industrial Nucleonics Corporation, a corporation of Ohio
Filed Oct. 21, 1963, Ser. No. 317,445
10 Claims. (Cl. 324—61)

This invention relates generally to a measurement system having a plurality of signals at different frequencies applied to a capacitance probe, particularly to such a system for measuring moisture and more particularly to such a system in which the measurement is dependent upon the ratio of signals at two different frequencies.

The present invention is an improvement over various previously known systems such as disclosed in copending applications Ser. No. 41,975, filed July 11, 1960, for Mesuring System, by Albert F. G. Hanken, now Patent No. 3,155,900; Ser. No. 57,234, filed Sept. 20, 1960, for Measuring Circuit, by Clyde W. Baird, now Patent No. 3,234,460; Ser. No. 259,116, filed Feb. 18, 1963, for Measuring System, by Clyde W. Baird, now Patent No. 3,241,062; and Ser. No. 268,268, filed Mar. 29, 1963, for Measuring System, by Alan Norwich, now Patent No. 3,290,588. In these earlier systems the capacitance probe forms part of a bridge circuit. The probe includes as a dielectric the material to be measured. The bridge is simultaneously supplied with a pair of signals at two different frequencies in such manner that the capacitance arms of the bridge have balanced voltages at widely displaced frequencies applied at their output terminals. There are produced across the bridge two bridge unbalance signals at the respective frequencies but at respective amplitudes varying in accordance with the unbalance of the bridge at each frequency. The unbalance signals are amplified and applied to a pair of filters, one passing the signal at one frequency to a first detector and the other passing the signal at the other frequency to a second detector. The outputs of the detectors are D.C. detection signals of magnitudes that vary in accordance with the amplitude of the unbalance signals at the respective frequencies. The two signals from the detectors are then applied to a computer for computing an indication of a property of the capacitance probe, in particular its moisture content.

In these earlier systems, the computer derived a function related to the ratio of the two unbalance signals. A difficulty with these earlier systems was that the ratio of the two signals was not a single valued function of the moisture content of the material being measured. At relatively low moisture levels the ratio increased steadily with moisture. However, at a certain moisture level, the ratio reached a peak and thereafter diminished. In measurements near the peak it was difficult to tell on which side of the peak the measurement was being made, and a particular ratio corresponded to two possible moisture contents.

It has been suggested that the detection signal corresponding to the high frequency unbalance be limited or clamped before the peak is reached in the ratio function. This would prevent a double valued relationship between the ratio and moisture and provide unequivocal measurements. However, at moisture contents above the point where the high frequency signal was clamped, the instrument would operate as a single frequency moisture system and hence would not be independent of mass, although below this point the system would operate as a dual frequency moisture system with all of the attendant advantages.

In accordance with the present invention, the system is not all at once switched from a dual frequency system to a single frequency system, but rather is shifted gradually so as to preserve over a broader region at least some of the advantages of the dual frequency system, while still preventing a double valued function. In the present invention, one or the other of the detection signals is modified by a non-linear circuit that modifies the signals more at higher amplitudes. The gain of the low frequency channel may be increased at higher amplitudes or the gain of the high frequency channel may be decreased at higher amplitudes.

Accordingly, it is a primary object of the present invention to provide a new and improved dual frequency measurement system, most particularly for measuring the moisture content of material.

Another object of the present invention is to provide a dual frequency moisture gauge in which the ratio of the detection signals of the two frequencies is a single valued function of moisture content.

Still another object of the present invention is to provide a dual frequency moisture measurement system in which one of the two detection signals is gradually modified as moisture content increases.

A further object of the present invention is to provide a dual frequency moisture measurement system in which means is provided to control at least one of the two detection signals to provide a single valued function for the complete range of the quantity being measured, the control acting gradually as the moisture content increases.

Other objects and features of the present invention will become apparent from the following detailed description when taken in conjunction with the drawings in which:

FIGURE 1 is a diagrammatic illustration of one form of the present invention including an attenuator for attenuating the high frequency detection signal to prevent a double-valued function;

FIGURE 2 shows curves of the operating characteristics of the system of FIGURE 1 both with and without the attenuator;

FIGURE 3 shows the operating characteristic of one form of attenuator used in the present invention;

FIGURE 4 is a diagrammatic illustration of a form of the invention utilizing different bridge and bridge excitation circuits and a different readout circuit;

FIGURE 5 is a diagrammatic illustration of a form of the invention utilizing the bridge excitation circuit shown in FIGURE 1 with the read-out circuit shown in FIGURE 4;

FIGURE 6 is a diagrammatic illustration of an alternative form of the present invention including a variable gain amplifier for increasing the low frequency detection signal to prevent a double-valued function;

FIGURE 7 shows the operating characteristic of a shaper circuit and amplifier used in the form of the invention shown in FIGURE 6; and FIGURE 8 shows the operating characteristics of the system of FIGURE 6.

The present invention is applicable to systems like that described in the aforesaid Baird application Ser. No. 259,116, where the ratio $S_L/S_H$ is not directly determined but wherein an equivalent function is derived by modifying the output of the low frequency oscillator to maintain the ratio of detection signals constant, preferably at unity. This preferred form of the invention is illustrated in FIGURE 1.

Referring now to the drawings, FIGURE 1 shows a system for measuring the moisture content of material 11, which may be paper, for example. A pair of oscillators 10 and 12 are operative to produce a pair of input signals. These input signals are at widely displaced frequencies and are referred to hereinafter as the high and low frequencies, $f_1$ and $f_2$, respectively. In certain measurements it has been found convenient and desirable to use frequencies of 500 kilocycles and 100 kilocycles, respectively.

The high and low frequency input signals are applied to a bridge circuit 14. As shown in FIGURE 1, the output of the low frequency oscillator 12 is taken from a tap 16 on a potentiometer or voltage divider 18 in order that the magnitude of the signal therefrom can be varied by variation of the potentiometer setting. Except where the context indicates otherwise, the output signal of low frequency oscillator 12 will be considered herein as the signal appearing at tap 16. The signals are applied to an A.C. feedback amplifier 20 through respective input impedances 22 and 23.

Amplifier 20 is capable of amplifying both frequencies and does not include tuned elements. In this way the amplifier 20 can accommodate any frequency within a given range without requiring bridge adjustments. The voltage capability of the amplifier 20 must be the peak to peak voltage swing of the low frequency signal required by the bridge plus the peak to peak voltage swing of the high frequency signal. This amplifier, although capable of high gain, is preferred to be operated at a gain of unity with feedback. Feedback is by means of impedance 25 and provides a low output impedance and good gain stability. The amplifier 20 is preferably used as a type of A.C. summing amplifier. In this way the two frequencies may be fed simultaneously to the bridge without frequency acceptor or rejector circuits that would normally be required to prevent one frequency source from loading the other. In the preferred form of this invention, impedances 22, 23 and 25 are alike, although not necessarily of equal value; the signals at the output of amplifier 20 are then of opposite phase from the output signals from oscillators 10 and 12, and are equal to the sum of the oscillator signals each divided by the ratio of the respective input impedances 22 or 23 to the feedback impedance 25.

The combined signals from amplifier 20 are applied to an input terminal 24 of the bridge 14 which is connected to a plate 40 of a capacitance probe 36. As shown, the probe 36 preferably comprises a fringed field capacitor, having a second plate 42 and a grounded guard electrode 44 between the plates. The material 11 being measured forms a part of the dielectric of the capacitance probe 36. It is also possible to utilize a parallel plate capacitor with the material 11 passing between the plates.

The combined signals, in addition to being fed to the capacitance probe 36, are also fed through an input impedance 28 into a phase inverter amplifier 30. This provides combined signals of phase opposite to the combined signals applied to the capacitance probe 36. The combined signals of opposite phase are applied to a second input terminal 26 of the bridge 14 which is connected to a balancing capacitor 38. At each frequency a signal of one phase is applied between ground (as a reference datum) and terminal 24 and a signal of opposite phase is applied between ground and terminal 26. The output of the bridge circuit is taken between a measuring terminal 46 and ground and is applied to an output amplifier 32.

The amplifier 30 is preferably like amplifier 20 and has a similar feedback impedance 33; preferably impedances 28 and 33 are identical. The output of amplifier 30 will then be equal to the input of impedance 28 but of opposite phase. The signals applied to the bridge terminals 24 and 26 are therefore equal and opposite. Balancing capacitor 38 is adjusted to equal the capacitance of probe 36 when material 11 is absent from the probe, and the bridge is then balanced at both frequencies as may be observed at the measuring terminal 46.

The bridge may also be balanced at other values of balancing capacitor 38 by changing the relative magnitude of impedances 28 and 33. That is, if the impedance of impedance 28 is, for example, three times that of impedance 33, the phase inverter steps the signal down by a factor of three. Balance may then be achieved by making the balancing capacitor 38 three times larger. In either case, with the bridge balanced, any change in the output of amplifier 20, as may be occasioned by changes in the amplifier 20 or its input from oscillators 10 and 12, will result in a balancing change in the oppositely phased output of amplifier 30. Thus, the bridge automatically remains at a given balance.

Although impedances 28 and 33 are shown as parallel capacitors and resistors, they may also be pure capacitors or resistors. The important criterion is that both of the impedances be like. They need not be equal, but they should introduce substantially the same phase shift at each frequency. The current through the input impedance 28 flows through the feedback impedance 33 with no current flowing into the amplifier itself. In this case, if the impedances are like, the voltage at the output of the amplifier is of phase opposite to that of the input voltage but of magnitude equal to the input voltage divided by the ratio of the input impedance to the feedback impedance. This ratio should be real at all frequencies; that is, the feedback impedance should be substantially like the input impedances, although its magnitude may be greater or smaller, in order that it not introduce appreciable phase shift in addition to the 180° phase shift of the amplifier 30. As used herein, like does not necessarily imply the same magnitude.

As an illustration of the operation of this system, moisture measurement is considered. With the bridge balanced as above and with equal signals applied at each frequency, when the material 11 contains no moisture, the high frequency signal developed at terminal 46 will be of the same amplitude as the low frequency signal. If moisture were to be introduced into the material 11, the low frequency signal would increase more than the high frequency signal. However, if only the mass of the material were to be increased, both the high and the low frequency signals would increase, but the ratio of the one signal to the other would remain constant.

The signals of both frequencies developed at terminal 46 are applied to the amplifier 32 which may have a feedback loop through a capacitor 34. The output amplifier 32 acts as an A.C. summing amplifier and applies the combined signals to high and low frequency band pass filters 54 and 56, respectively, if necessary, with additional amplification. These filters serve to separate the signals at the two frequencies. The filter 54 passes the detection signal at the higher frequency, $f_1$, while filter 56 passes the detectioin signal at the lower frequency, $f_2$. The detection signal at the higher frequency is then applied to a demodulator 58, which may comprise a diode and serves to derive a D.C. detection signal at a terminal 60. A capacitor 62 and a resistor 64 may be connected between the terminal 60 and ground as shown. The D.C. signal ($S_H$) thus derived on terminal 60 is thus a measure of the unbalance of the bridge at the higher frequency.

Similarly, the low frequency detection signal passing low frequency band pass filter 56 is applied to a low frequency demodulator 66 which derives a D.C. detection signal ($S_L$) on a terminal 68 which is connected to ground through a capacitor 70 and a resistor 72. This D.C. signal ($S_L$) is similarly a measure of the unbalance of the bridge at the lower frequency. For constant input signals from the oscillators 10 and 12, the ratio of these signals $S_L/S_H$ provides an indication of moisture content.

In FIGURE 2 there are illustrated curves of signals $S_L$ and $S_H$ as functions of moisture, with fixed output signals from oscillators 10 and 12. The curve $S_L$ represents the D.C. detection signal $S_L$ whereas the curve $S_H$ represents the D.C. detection signal $S_H$. The curve $S_L/S_H$ represents the ratio $S_L/S_H$. As illustrated the curve may under some conditions reach a peak and then fall with increasing moisture content. A given value of the ratio $S_L/S_H$ corresponds to two different moisture contents and would be unreliable for any system where the moisture varied over wide ranges were it not for an attenuator 74, connected between terminal 60 and an output terminal 75.

The attenuator 74 serves to prevent a double-valued function. In the preferred form of the invention illustrated in FIGURE 1, the attenuator circuit includes a series resistor 89 connected between terminals 60 and 75, and a number of shunt circuits. Bias voltages are supplied to the shunt circuits by a voltage divider 90 which is comprised of series resistors 91, 92, 93, 94, and 95 with terminals 96, 97, 98 and 99 between respective resistors. The voltage divider is supplied with voltage of positive polarity by a voltage source 100. A resistor 101 is connected to terminal 75 in series with a diode 102 which is connected to terminal 96. Similarly, a resistor 103 and a diode 104 are connected in series between terminals 75 and 97 and a resistor 105 and a diode 106 between terminals 75 and 98. A diode is connected between terminals 75 and 99.

The voltage divider supplies bias voltages so that terminal 97 is more positive than terminal 96, terminal 98 is more positive than terminal 97, and terminal 99 is more positive than terminal 98. When the voltage on terminal 75 is less than the bias voltage on terminal 96, the attenuator is ineffective and substantially the entire voltage on terminal 60 appears on terminal 75. This is because the diodes are effectively open circuits under these conditions. However, when the voltage on terminal 75 exceeds the bias voltage on terminal 96 by any substantial amount, the diode 102 becomes effectively a short circuit and current flows through resistor 101. This results in a voltage drop across resistor 89, and the voltage on terminal 75 is less than the voltage on teminal 60, although these voltages are linearly related. By appropriate selection of components the relationship between signal-in ($S_H$) on terminal 60 to signal-out on terminal 75 ($S_H'$) may be as illustrated in FIGURE 3. The bias voltages for terminals 96, 97, 98 and 99 are shown set at 5, 7, 8.4 and 9.1 volts respectively. The resistors 89, 101, 103 and 105 are selected to achieve the slopes illustrated. The signal-in on terminal 60 is equal to the signal-out on terminal 75 up to a signal of 5 volts, i.e., the bias on terminal 96. Then the slope changes to a new value up to an output signal of 7 volts, the bias on terminal 97. Current then flows through resistor 103, causing more current flow through resistor 89 and decreasing further the slope of the curve of FIGURE 3. The slope is further decreased in the same fashion when the voltage on terminal 75 exceeds the bias voltage on terminal 98. Finally, when the voltage on terminal 75 reaches the bias voltage on terminal 99, terminal 75 is clamped to the terminal 99 through diode 107, and the curve in FIGURE 3 becomes horizontal; the signal-out cannot rise further.

The effect of this attenuator 74 on the measurement will be apparent from consideration of FIGURE 2. The attenuator changes the gain of the high frequency channel in a series of gradual steps until the signal is clamped. (In this connection, the words "gain" and "attenuation" as used herein refer to the same phenomenon; gain is the reciprocal of attenuation and can be less than unity.) The signal appearing on terminal 75 is shown as $S_H'$. It substantially coincides with signal $S_H$ up to a voltage of 5 volts, the bias on terminal 96 (identified in FIGURE 2 as BIAS–96), where diode 102 conducts and changes the gain of the circuit and hence the slope of the curve. Similarly at 7 volts (BIAS–97), 8.4 volts (BIAS–98) and 9.1 volts (BIAS–99), the last being the voltage on terminal 99 to which the signal $S_H'$ is limited by diode clamp 107. Points of inflection are indicated respectively at 108, 109, 110 and 111. These changes in slope produce corresponding changes in the slope of the curve $S_L/S_H'$ at points of inflection 112, 113, 114 and 115, respectively.

The presence of the attenuator 74 thus makes this ratio $S_L/S_H'$ (the ratio of the signals $S_L$ and $S_H'$) a single valued function of moisture, albeit discontinuous at points 112, 113, 114 and 115. Below point 112, the system functions like the dual frequency systems previously known and has all its advantages. Above point 115, the system functions essentially as a single frequency system but has the advantage over the prior two frequency systems of being single valued. Between points 112 and 115, the system is hybrid and partakes of some of the advantages of each, being relatively independent of mass variations while avoiding the ambiguous double value function. It thus serves to extend the useful range of the measuring system to higher moisture contents with a substantial degree of independence of mass variations. Although not so independent of mass variations and hence not so reliable as the dual frequency part of the system operating at low moisture contents, the hybrid and single frequency parts of the system operating at higher moisture contents are generally satisfactory for it is generally not necessary to have such accurate measurements at high moisture contents anyway. Often only the low moisture contents are of much interest in the process or product being measured or controlled, the measurement at higher moisture contents being progressively relatively unimportant. In some circumstances accuracy above point 115 is of no consequence, it being necessary only to limit the signal $S_H'$ to prevent the double-valued function.

In the system shown in FIGURE 1, which is similar to the system shown in the aforesaid Baird application, Ser. No. 259,116, the ratio $S_L/S_H$ or $S_L/S_H'$ is not measured directly but an equivalent measurement is made by a servo system that maintains this ratio constant, preferably at unity. The output circuits of the demodulators, including respective resistors 64 and 72 and respective capacitors 62 and 70, could be adjusted to provide different gain for the two signals and hence a different constant ratio could be maintained, but it is preferred that the gains be the same and the ratio maintained at unity.

In accordance with the present invention the signal $S_H$ on terminal 60 may be applied to the attenuator circuit 74 which, as described above, provides a modified signal output $S_H'$ on terminal 75. It is then the ratio of signals $S_L/S_H'$ which is kept at unity. To achieve this, the outputs of the demodulators may be applied to a servo amplifier 148, which acts in a conventional manner to produce an output of amplitude and polarity dependent upon the difference between the two D.C. signals, i.e., $S_L - S_H'$. The output of amplifier 48 drives a servo motor 150 which mechanically through linking means 152 (which may be a shaft) moves the tap 16 to vary the output of the low frequency oscillator 12. Depending upon whether the low frequency signal $S_L$ is less than or greater than the high frequency signal $S_H'$, the polarity of the output of servo amplifier 148 is such as to cause the motor 150 to rotate so as to move the tap 126 up or down, respectively, thus increasing or decreasing the output of low frequency oscillator 12 as necessary to reduce the difference between the two D.C. signals. So long as the two signals are different, the tap is moved. When the two signals are equal, the servo system is balanced, and the tap 16 is at that point on the slidewire that provides the appropriate amplitude of the output of the low frequency oscillator to produce this balance. The position of the tap is indicative of this output and is likewise indicative of moisture, as will now be shown.

For the conditions producing the curves as shown in FIGURE 2, the outputs of the two oscillators were of equal amplitude. Were the output of the low frequency oscillator to be doubled, the ratio of $S_L$ to $S_H'$ would be doubled. Hence, if the moisture content of the material were to change so as to cause the ratio of $S_L$ to $S_H'$ to change from unity to two, the output of oscillator 12 could be reduced by a factor of two to return the ratio to unity. This is automatically done by the system of FIGURE 1, and the position of the tap 16 is the reciprocal of the ratio of $S_L$ to $S_H'$ that would have existed had the oscillators had the same output. A read-out device 154 may be coupled to the tap by linkage means 156 so as to read out the tap position and hence moisture content. The particular relationship between tap position and the read-out scale is determined by the particular manner in which the potentiometer 18 is wound. The system can thus be calibrated to read-out moisture content directly. The attenuator circuit 74 prevents a double-valued function by limiting the D.C. detection signal corresponding to unbalance of the bridge at the high frequency. At the same time, it preserves much of the advantage of the two frequency system up to higher moisture contents.

In FIGURE 4 is illustrated a system utilizing the present invention with a different bridge circuit and a different read-out circuit. As shown the outputs of the high and low frequency oscillators are applied to the bridge circuit 14 through respective transformers 158 and 160. The center taps of the secondary windings of the respective transformers are grounded. If necessary, a balancing circuit can be used to make certain that the ground is truly in the center of the secondaries. As shown, the secondaries may be shunted by respective capacitors 162 and 164. The high frequency signals may be coupled to opposite terminals 24 and 26 of the bridge circuit 14 through high frequency coupling capacitors 166 and 168. The low frequency signal may be applied to the same terminals 24 and 26 through high frequency rejection traps 170 and 172. The bridge is completed by measuring probe 36 and balancing capacitor 38. The measuring probe may comprise probe electrodes 40 and 42 with a grounded guard electrode 44 therebetween and is basically a fringe field capacitor as used in the system shown in FIGURE 1. The output of the bridge is taken between ground and terminal 46 which is the terminal common to probe 36 and capacitor 38.

As is known in the prior art, the bridge is initially balanced at both frequencies with no material at the probe by appropriate adjustment of the balancing capacitor 38. If necessary, phase adjustments can be made by adjusting variable resistors 173 and 174 connected in one side of each of the respective input circuits. When the material is then placed in operative relationship to the probe, the bridge becomes unbalanced at both frequencies and the unbalance signals are applied to a detector amplifier 175 wherein both signals are amplified and applied simultaneously to the high frequency band pass filter 54 and the low frequency band pass filter 56. These filters operate as explained above in connection with FIGURE 1 and serve to separate the signals, which are converted to D.C. signals $S_L$ and $S_H$, by the circuitry explained in detail above.

The D.C. signal $S_H$ is applied through the attenuator circuit 74 to the terminal 75 which in turn is connected to the input of a servo amplifier 176. The D.C. detection signal $S_L$ is applied to a ratio computing potentiometer 178 having a movable output tap 180 connected to the servo amplifier 176. The output of the servo amplifier is applied to a servo motor 182 which operates in a conventional manner to drive the movable tap 180 of the ratio computing potentiometer 178 in such direction as to reduce the input to the servo amplifier 176, i.e., to make the input on tap 180 equal to the input at terminal 75. Thus in a conventional manner the balanced position of the ratio computing potentiometer is systematically related to the ratio of the signal on terminal 68 to the signal on terminal 75, i.e., $S_L/S_H'$. This systematic relationship may be direct proportionality. At the same time, the servo motor 182 drives a tap 183 of a moisture read-out potentiometer 184.

A fixed voltage source 186 may be applied between the terminals of the potentiometer 184 and an output signal read on a meter or recorder 188. The potentiometer 184 and meter 188 may be calibrated empirically to read moisture.

The invention may also be utilized in a system such as that shown in the aforesaid Hanken application Ser. No. 41,975. The system of Hanken is similar to that of FIGURE 4, but has modified bridge and bridge excitation circuits. In using the invention in the Hanken system, the read-out circuits may be those described above in connection with FIGURE 4. That is, they may include the servo system and ratio computing potentiometer of the system of FIGURE 4 to provide a reading on meter 188 indicative of moisture content. Alternatively, the read-out circuits may be those explained more fully in the aforesaid Hanken application, which serve to derive the function $$\frac{S_L - S_H'}{S_H'}$$

which is equivalent to $(S_L/S_H')-1$. The attenuator circuit 74 serves exactly the same function in the system following Hanken as in the apparatus of FIGURES 1 and 4.

A further modification of the invention is shown in FIGURE 5 wherein the bridge and bridge excitation circuit shown in FIGURE 1 is used with the computer and read-out circuit shown in FIGURE 4. The system functions as described above in connection with the explanation of the circuits shown in FIGURES 1 and 4, and the attenuator 74 operates in the same manner as in the circuit shown in FIGURE 1. That is, rather than utilizing the difference between $S_H'$ and $S_L$ as the signals indicative thereof appear on terminals 75 and 68, respectively, and using this difference to control the low frequency signal from low frequency oscillator 12, their ratio is computed by ratio computing potentiometer 178 and read out on meter 188.

In FIGURE 6 is illustrated an alternative form of the invention where, rather than gradually reducing the gain of the high frequency channel, the apparatus gradually increases the gain of the low frequency channel. In FIGURE 6, a variable gain amplifier 202 is shown connected between the low frequency band pass filter 56 and the low frequency demodulator 66. The modified output signal $S_L'$ appears on terminal 68. The ratio computing potentiometer 178 therefore computes the ratio $S_L'/S_H$.

The amplifier 202 may take the form of a remote cutoff amplifier with gain control, wherein a D.C. control signal controls bias and hence amplifier gain. The D.C. control signal may be derived from signal $S_H$ through a shaper circuit 204. This shaper circuit may be a conventional diode shaper having padded circuits to produce a D.C. output signal that is a non-linear function of $S_H$, rising more rapidly than $S_H$. The characteristic of shaper 204 may be such as to provide an overall shaper-amplifier characteristic as shown in FIGURE 7. The signal $S_L'$ may then be the function of moisture as shown in FIGURE 8, wherein $S_L$, $S_H$ and $S_L/S_H$ are shown in the same form as in FIGURE 2. The ratio $S_L'/S_H$ may then be the single valued function of moisture as is shown in FIGURE 8. Any one of a number of gain controlled circuits may be used. It is necessary only to use one that provides sufficient increase in the slope of the curve $S_L'$ so that the ratio $S_L'/S_H$ is not double valued. The gain is preferably such as to modify the low frequency signal very little in the region of greatest interest so as to provide substantially all of the advantages of a dual frequency system and provide a measure of moisture independent of mass in this region. The gain gradually increases above this range, making the measurement more and more mass dependent as the moisture increases but still preserving a single valued function and thus providing unambiguous measurements.

FIGURE 6 illustrates a system similar to the dual frequency system shown in FIGURE 5. That is, it has the same bridge and read-out circuits. It should be noted that the systems shown in FIGURES 1 and 4 could be similarly modified to use the shaper 204.

Although certain specific embodiments have been described herein, modifications may be made thereto without departing from the true spirit and scope of the invention as set forth in the appended claims. For example, it should be noted that although the probe is called a capacitance probe, the dielectric constant of the material being measured may have an imaginary, i.e., resistive, component, and the probe electrodes need not be insulated from the material being measured. The invention also has applicability to a system where the frequency rather than the amplitude of the low frequency oscillator is varied to maintain the ratio $S_L/S_H'$ or $S_L'/S_H$ constant, and that frequency is measured as an indication of moisture content. Such a system, but without the attenuator or variable gain amplifier of the present invention, is described in copending application Ser. No. 107,794, filed May 4, 1961, for Measuring System, by Albert F. G. Hanken, now Patent No. 3,155,901.

It should also be noted that the use of the invention to avoid a double valued function includes the case where the function becomes substantially flat at high moisture; i.e., it does not vary substantially with changes in moisture. The present invention provides a function that rises continuously.

What is claimed is:

1. A system for determining a property of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, means coupled to said measuring probe for deriving a first detection signal related to signals from said probe occasioned by said material at said high frequency and a second detection signal related to signals from said probe occasioned by said material at said low frequency, variable gain means for modifying the amplitude of one of said first and second detection signals, and means responsive to said one signal as modified and to the other of said first and second detection signals for comparing said signals to derive an indication of said property of said dielectric material, said variable gain means having a gain gradually changing as a function of the amplitude of one of said first and second detection signals.

2. A system for determining the moisture content of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, means coupled to said measuring probe for deriving a first detection signal related to signals from said probe occasioned by said material at said high frequency and a second detection signal related to signals from said probe occasioned by said material at said low frequency, and means responsive to said first and second detection signals for comparing said detection signals to derive an indication of said moisture content of said dielectric material, said last named means including variable gain means for modifying the amplitude of at least one of said first and second detection signals before their comparison to limit said indication of said moisture content to a single-valued function for all moisture contents, said variable gain means having a gain gradually changing as a function of the amplitude of one of said first and second detection signals.

3. A system for determining the moisture content of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, detector means coupled to said measuring probe for deriving a first D.C. detection signal related to signals from said probe occasioned by said material at said high frequency and a second D.C. detection signal related to signals from said probe occasioned by said material at said low frequency, an attenuator circuit coupled to said detector means and attenuating said first detection signal whenever it exceeds a first fixed predetermined amplitude, a limiter circuit coupled to said attenuator circuit and limiting said first detection signal as attenuated by said attenuator circuit substantially to a second fixed predetermined amplitude whenever said signal as attenuated reaches said second amplitude, said second predetermined amplitude being greater than said first, and means responsive to said second D.C. detection signal and said first D.C. detection signal as modified by said attenuator circuit and said limiter circuit for comparing said signals as an indication of said moisture content of said dielectric material.

4. A system for determining the moisture content of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, means coupled to said measuring probe for deriving a first D.C. detection signal related to A.C. signals from said probe occasioned by said material at said high frequency and a second D.C. detection signal related to A.C. signals from said probe occasioned by said material at said low frequency, and combining means responsive to said first and second D.C. detection signals for combining said signals to derive indication of their ratio as a measure of said moisture content of said dielectric material, said combining means including attenuator means for attenuating said first D.C. detection signal to limit said ratio to a single-valued function of moisture content for all moisture contents, said attenuator means attenuating large signals more than the smaller signals in accordance with an attenuation characteristic gradually increasing with amplitude.

5. A system for determining a property of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, detector means coupled to said measuring probe for deriving a first D.C. detection signal related to signals from said probe occasioned by said material at said high frequency and a second D.C. detection signal related to signals from said probe occasioned by said material at said low frequency, attenuator means coupled to said detector means for attenuating said first D.C. detection signal, and means responsive to said first D.C. detection signal as so attenuated and to said second D.C. detection signal for comparing said signals to derive an indication of said property of said dielectric material, said attenuator means including a series resistor having an input terminal coupled to said detector means and an output terminal coupled to said means responsive to said first detection signal as so attenuated, a plurality of shunting circuits coupled to said output terminal, each of said shunting circuits including a diode biased to pass only signals exceeding a respective bias voltage, and means respectively biasing said diodes at successively higher levels, at least one of said diodes being coupled to said output terminal through a separate resistor.

6. A system for determining a property of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, detector means coupled to said measuring probe for deriving a first D.C. detection signal related to signals from said probe occasioned by said material at said high frequency and a second D.C. detection signal related to signals from said probe occasioned by said material at said low frequency, attenuator means coupled to said detector means for attenuating said first D.C. detection signal, and means responsive to said first D.C. detection signal as so attenuated and to said second D.C. detection signal for comparing said signals to derive an indication of said property of said dielectric material, said attenuator means including a series resistor having an input terminal coupled to said detector means and an output terminal coupled to said means responsive to said first detection signal as so attenuated, a plurality of shunting circuits coupled to said output terminal, each of said shunting circuits including a diode biased to pass only signals exceeding a respective bias voltage, and means respectively biasing said diodes at successively higher levels, each of said diodes except that biased to the highest level being coupled to said output terminal through a respective resistor.

7. Apparatus for quantitative determination of at least one property of a dielectric material by measurement of a function of the dielectric properties of said material, said apparatus comprising a plurality of sources of electrical signals at different respective frequencies, detecting means, and capacitive probe means having spaced electrodes arranged for applying electrical signals from said sources to at least a portion of said material and at the same time coupling said detecting means to said portion, said detecting means including means for deriving separate signals each resulting from the signals applied from a respective source as these applied signals are influenced by the mass of said material and the dielectric properties of said material at the frequency of that source, variable gain means for modifying the amplitude of at least one of said separate signals, and means for combining said separate signals as modified to produce a continuous resultant signal that is a function of the ratio of said separate signals as modified as an indication of said property of said dielectric material, said variable gain means having a gain gradually changing as a function of the amplitude of one of said separate signals.

8. Apparatus for quantitative determination of the moisture content of a dielectric material by measurement of a function of the dielectric properties of said material, said apparatus comprising first and second sources of electrical signals at high and low frequencies, respectively, detecting means, and capacitive probe means having spaced electrodes arranged for applying electrical signals from said sources to at least a portion of said material and at the same time coupling said detecting means to said portion, said detecting means including means for deriving first and second detection signals each resulting from the signals applied from a respective one of said first and second sources as these applied signals are influenced by the mass of said material and the dielectric properties of said material at the frequency of that source, an attenuator circuit attenuating said detection signal related to said high frequency whenever it exceeds a first fixed predetermined amplitude, a limiter circuit limiting said detection signal as attenuated by said attenuator circuit substantially to a second fixed predetermined amplitude whenever said detection signal reaches said second amplitude, said second predetermined amplitude being greater than said first, and means for combining said detection signals to produce a continuous resultant signal that is a function of the ratio of said detection signals as modified by said attenuator circuit and said limiter circuit as an indication of said moisture content of said dielectric material.

9. A method for the quantitative determination of the moisture content of a dielectric material by measuring a function of the dielectric properties of said material, said method comprising applying electrical signals at two different frequencies to at least a portion of the material, deriving separate signals each resulting from the signals applied at a respective frequency as these applied signals are influenced by the mass of said material and the dielectric properties of said material at that frequency, combining said separate signals to produce a continuous resultant signal that is a function of the ratio of said separate signals and quantitatively indicative of said moisture content, and modifying the amplitude of at least one of said separate signals prior to said combining to make the indication of said moisture content a single-valued function of said ratio for all moisture contents, said modifying step being performed in accordance with a gain characteristic changing gradually as a function of the amplitude of one of said separate signals.

10. A method for the quantitative determination of the moisture content of a dielectric material by measuring a function of the dielectric properties of said material, said method comprising applying electrical signals at two different frequencies to at least a portion of the material, deriving two separate D.C. detection signals each resulting from the signals applied at a respective frequency as these applied signals are influenced by the mass of said material and the dielectric properties of said material at that frequency, attenuating said detection signal related to the higher of said frequencies whenever it exceeds a first fixed predetermined amplitude, limiting said thus attenuated detection signal substantially to a second fixed predetermined amplitude whenever said attenuated signal reaches said second amplitude, said second predetermined amplitude being greater than said first, and combining said detection signals as thus attenuated and limited to produce a continuous resultant signal that is a function of the ratio of said detection signals and quantitatively indicative of said moisture content.

References Cited
UNITED STATES PATENTS

| | | | |
|---|---|---|---|
| 3,155,900 | 11/1964 | Hanken | 324—61 |
| 3,155,901 | 11/1964 | Hanken | 324—61 |
| 3,234,460 | 2/1966 | Baird | 324—61 |
| 3,241,062 | 3/1966 | Baird | 324—61 |
| 3,290,588 | 12/1966 | Norwich | 324—61 |

WALTER L. CARLSON, *Primary Examiner.*

EDWARD E. KUBASIEWICZ, *Examiner.*